(12) United States Patent
Li

(10) Patent No.: US 12,155,849 B2
(45) Date of Patent: Nov. 26, 2024

(54) METHOD AND SYSTEM FOR IMAGE COMPRESSING AND CODING WITH DEEP LEARNING

(71) Applicant: Telefonaktiebolaget LM Ericsson (publ), Stockholm (SE)

(72) Inventor: Yun Li, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 18/012,316

(22) PCT Filed: Jun. 25, 2020

(86) PCT No.: PCT/SE2020/050663
§ 371 (c)(1),
(2) Date: Dec. 22, 2022

(87) PCT Pub. No.: WO2021/262053
PCT Pub. Date: Dec. 30, 2021

(65) Prior Publication Data
US 2023/0300354 A1    Sep. 21, 2023

(51) Int. Cl.
*G06N 3/045* (2023.01)
*G06N 3/084* (2023.01)
(Continued)

(52) U.S. Cl.
CPC ............. *H04N 19/42* (2014.11); *G06N 3/045* (2023.01); *G06N 3/084* (2013.01);
(Continued)

(58) Field of Classification Search
CPC .................................................. G06N 3/045
See application file for complete search history.

(56) References Cited

U.S. PATENT DOCUMENTS 10,652,581 B1    5/2020    Bokov et al.
2019/0068970 A1  2/2019    He
(Continued)

FOREIGN PATENT DOCUMENTS

| CN | 110852439 A   | 2/2020 |
| EP |   3620983 A1  | 3/2020 |
| WO | 2016145379 A1 | 9/2016 |

OTHER PUBLICATIONS

Agustsson, Eirikur, et al., "Soft-to-Hard Vector Quantization for End-to-End Learning Compressible Representations", arXiv: 1704. 00648v2 [cs.LG], XP055605265, Jun. 8, 2017, 1-16.
(Continued)

*Primary Examiner* — Y Lee
(74) *Attorney, Agent, or Firm* — Murphy, Bilak & Homiller, PLLC

(57) ABSTRACT

An image processing system (100) and methods therein for compressing and coding an image and for optimizing its parameters are disclosed. The embodiments herein provide an improved system and simplified method with deterministic uniform quantization with integer levels based on Softmax function for image compression and coding. The embodiments herein produce exact discrete probability mass function for latent variables to be coded from side information. The embodiments herein enable training of the image processing system to minimize the bit rate through backpropagation at the same time. Moreover, the embodiments herein create the possibility to encode region of interest (ROI) areas during coding.

20 Claims, 10 Drawing Sheets

(51) Int. Cl.
    *H04N 19/124*    (2014.01)
    *H04N 19/13*     (2014.01)
    *H04N 19/147*    (2014.01)
    *H04N 19/167*    (2014.01)
    *H04N 19/42*     (2014.01)
    *H04N 19/80*     (2014.01)
    *H04N 19/86*     (2014.01)

(52) U.S. Cl.
    CPC ........... *H04N 19/124* (2014.11); *H04N 19/13* (2014.11); *H04N 19/147* (2014.11); *H04N 19/167* (2014.11); *H04N 19/80* (2014.11); *H04N 19/86* (2014.11)

(56) References Cited

U.S. PATENT DOCUMENTS

2020/0092556 A1   3/2020   Coelho et al.
2020/0107023 A1   4/2020   Lee et al.

OTHER PUBLICATIONS

Ballé, Johannes, et al., "Variational Image Compression With a Scale Hyperprior", Conference Paper at ICLR 2018, arXiv:1802.01436v2, 2018, 1-23.

Jiao, Licheng, et al., "A Survey on the New Generation of Deep Learning in Image Processing", Digital Object Identifier, vol. 7, IEEEAccess, Nov. 28, 2019,, 1-33.

Mentzer, Fabian, et al., "Conditional Probability Models for Deep Image Compression", arXiv:1801.04260e, Jun. 2019, 1-19.

Minnen, David, et al., "Joint Autoregressive and Hierarchical Priors for Learned Image Compression", 32nd Conference on Neural Information Processing Systems (NIPS 2018), Montreal, Canada, arXiv:1809.02736v1, Sep. 2018, 1-22.

Ponti, Moacir A., et al., "Everything you wanted to know about Deep Learning for Computer Vision but were afraid to ask", 2017 30th SIBGRAPI Conference on Graphics, Patterns and Images Tutorials, IEEE Computer Society, Oct. 2017, 17-41.

Mentzer, Fabian, et al., "Conditional Probability Models for Deep Image Compression", arXiv:1801.04260v1 [cs.CV], version 1, Jan. 12, 2018, 1-18.

(c)          (d)

METHOD AND SYSTEM FOR IMAGE COMPRESSING AND CODING WITH DEEP LEARNING

TECHNICAL FIELD

Embodiments herein relate to method and system for image compressing and encoding. In particular, the embodiments relate to learned image compression with region of interest coding.

BACKGROUND

Image compression with deep learning has been intensively explored during recent years. In general, learned based approaches have demonstrated great compression efficiency with respect to perceptual metrics, e.g., multi-scale structural similarity index (M-SSIM). Some of them have shown to outperform an implementation of a High Efficiency Video Coding (HEVC) intra encoder, i.e., Better Portable Graphics (BPG), with respect to the objective metric Peak Signal to Noise Ratio (PSNR). Therefore, learned based image and video coding has a great potential in becoming an important part of the future coding techniques. In addition, it has two significant advantages compared to traditional encoders. Firstly, it can be trained with a flexible input data format for compression without fundamentally changing the underlying algorithm. Secondly, any differentiable quality metrics can be applied with respect to full images for end-to-end training.

For examples, in J. Bane, et al., "Variational image compression with a scale hyperprior", *International Conference on Learning Representations* (ICLR), January 2018, an end-to-end trainable model for image compression based on variational auto-encoders is described. The model incorporates a hyperprior to effectively capture spatial dependencies in the latent variable representation. This hyperprior relates to side information, a concept universal to virtually all modern image codecs, but largely unexplored in image compression using artificial neural networks (ANNs). Unlike existing auto-encoder compression methods, this model trains a complex prior jointly with the underlying auto-encoder. This model leads to state-of-the-art image compression when measuring visual quality using the popular MS-SSIM index, and yields rate—distortion performance surpassing existing ANN-based methods when evaluated using a more traditional metric based on squared error PSNR. Furthermore, it provides a qualitative comparison of models trained for different distortion metrics.

In D. Minnen et al., "Joint Autoregressive and Hierarchical Priors for Learned Image Compression," arXiv: 1809.02736, September 2018, it is described that recent models for learned image compression are based on auto-encoders, learning approximately invertible mappings from pixels to a quantized latent variable representation. These are combined with an entropy model, a prior on the latent variable representation that can be used with standard arithmetic coding algorithms to yield a compressed bit-stream. Recently, hierarchical entropy models have been introduced as a way to exploit more structure in the latent variables than simple fully factorized priors, improving compression performance while maintaining end-to-end optimization. Inspired by the success of autoregressive priors in probabilistic generative models, autoregressive, hierarchical, as well as combined priors are examined, weighing their costs and benefits in the context of image compression. While it is well known that autoregressive models come with a significant computational penalty, it is fund that in terms of compression performance, autoregressive and hierarchical priors are complementary and, together, exploit the probabilistic structure in the latent variables better than all previous learned models.

In F. Mentzer et al., "Conditional Probability Models for Deep Image Compression," arXiv:1801.04260, June 2019, a technique is proposed to navigate the rate distortion trade-off for an image compression auto-encoder. The main idea is to directly model the entropy of the latent variable representation by using a context model, a 3D Convolutional Neural Network (CNN) which learns a conditional probability model of the latent variable distribution of the auto-encoder. During training, the auto-encoder makes use of the context model to estimate the entropy of its representation, and the context model is concurrently updated to learn the dependencies between the symbols in the latent variable representation.

However, there are some problems with the approaches described above. The stochastic quantization method with a uniform noise in J. Bane et al. may not be the optimal. The probabilities of the latent variables are modeled by a probability density function, i.e., Gaussian. This is partially due to the uniform noise that smooths out the density distribution of the latent variables. However, Gaussian might not be a good fit if a deterministic quantization is used.

The problem of the method in F. Mentzer et al. is that the context model is optimized with respect to a one-hot-key coding of an index associated to its quantized value. Therefore, the gradient cannot be back propagated to the analysis network to effectively minimize the bit rate of the latent variables. In addition, the context model is difficult for parallel operation.

One common problem of the approaches described above is that they change the way the Region of Interest (ROI) performed during encoding as compared to conventional codecs. This is because the encoding is a process of simply passing the image through the auto-encoder, and the latent variables are encoded losslessly. There is no quantization process that can handle a flexible quality assignment for different parts of an image.

SUMMARY

It is therefore an object of embodiments herein to provide an improved method and system for image compression and coding.

According to a first aspect of embodiments herein, the object is achieved by an image processing system for compressing and coding an image.

The image processing system comprises a first analysis network configured to generate a multidimensional matrix $Y(y_i)$ with compressed latent variables $y_i$ from the image X, wherein i is an index of an element $y_i$ in matrix Y.

The image processing system further comprises a first deterministic quantization unit with n uniform integer quantization levels. The first deterministic quantization unit comprises a Softmax function unit configured to generate a vector of normalized probabilities $P_y(P_{yi})$ indicating the probabilities of rounding a latent variable $y_i$ to each of the n quantization levels, a summer configured to sum up a multiplication of each of the n quantization levels with each of the normalized probabilities $P_{yi}$ to generate a pre-quantized latent variable $y'_i$ for each latent variable $y_i$, a processing unit configured to generate final quantized latent variables by rounding each of the pre-quantized latent variable $y'_i$ to its nearest integer level, $\hat{y}=\text{Round}(y')$, in forward computation during training process and actual compressing and encoding process, or taking the pre-quantized latent variable $y'_i$ as the final quantized latent variable $\hat{y}_i$, $\hat{y}=y'$, during training process with backward gradient propagation.

The image processing system further comprises an entropy coding unit configured to encoding or decoding the finale quantized latent variables $\hat{y}_i$ during actual compressing and encoding process.

The image processing system further comprises a first synthesis network configured to generate a reconstructed image $\hat{X}$ from the finale quantized latent variables during training process or from the encoded latent variables $\hat{y}_i$ during actual compressing and encoding process.

The image processing system further comprises a probability estimator. The probability estimator comprises a second analysis network configured to generate a matrix $Z(z_j)$ with latent variables $z_j$ further compressed from the Y matrix with the latent variables $y_i$, a quantization unit configured to quantize the further compressed latent variables $z_i$, an entropy coding and estimation unit configured to encode the quantized latent variables $z_i$ during actual compressing and encoding process or estimate the probability of the latent variables $z_i$ during training process, a second synthesis network together with a convolution layer configured to reconstruct a discrete probability distribution $V(V_i)$ for each latent variable $y_i$ and generate the probabilities for the n quantization levels for each latent variable $y_i$, and a normalization unit configured to normalize the reconstructed probability distribution by using a Softmax function and generate normalized probability mass functions $P_{r_i}(P_{r_i})$ for encoding the final quantized latent variables $\hat{y}_i$.

According to a second aspect of embodiments herein, the object is achieved by a method performed in an image processing system for optimizing parameters of the system. The method comprises the following actions: generating compressed latent variables $y_i$ from an image X; generating normalized probabilities $P_{y_i}(P_{yi})$ by a Softmax function and finale quantized latent variables $\hat{y}_i$ for the latent variables $y_i$; reconstructing an image $\hat{X}$ from the finale quantized latent variables $\hat{y}_i$; generating latent variables $z_j$ further compressed from the latent variables $y_i$; quantizing the further compressed latent variables $z_j$; estimating the probability of the latent variables $z_j$ and generating a second bitrate R2; reconstructing a discrete probability distribution $V(V_i)$ for each latent variable $y_i$; generating a normalized probability mass function $P_{r_i}$ by normalizing the reconstructed probability distribution $V(V_i)$ using a Softmax function for each latent variable $y_i$; calculating a first bitrate R1 as a sum of the cross entropy of the normalized probabilities $P_{y_i}$ and the normalized probability mass functions $P_{r_i}$ of all latent variables $y_i$; calculating a distortion D from the original image X and the reconstructed image $\hat{X}$; and optimizing the parameters of the image processing system by a rate-distortion function.

According to a third aspect of embodiments herein, the object is achieved by a method performed in an image processing system for compressing and encoding an image X. The method comprises the following actions: generating compressed latent variables $y_i$ from the image X; generating finale quantized latent variables $\hat{y}_i$ for the latent variables $y_i$; generating latent variables $z_j$ further compressed from the latent variables $y_i$; quantizing the latent variables $z_j$; encoding the latent variables $z_j$ and estimating probability matrix from the encoded latent variables $z_j$; reconstructing a discrete probability distribution $V(V_i)$ for each latent variable $y_i$; generating a normalized probability mass function $P_{r_i}$ by normalizing the reconstructed probability distribution $V(V_i)$ using a Softmax function for each latent variable $y_i$; encoding each of the finale quantized latent variables $\hat{y}_i$ using its corresponding normalized probability mass function $P_{r_i}$.

According to some embodiments herein, one or more region of interest, ROI, areas are identified in the image X and the representation of an ROI may be any one of a ROI mask containing zero and one values representing which image pixels belong to the ROI, four coordinates of an ROI box, or parameters that describe a certain shape of an ROI. A Context Adaptive Binary Arithmetical Coding (CABAC) engine may be used to encode the representation of an ROI.

The embodiments herein provide an improved system and simplified method with deterministic uniform quantization with integer levels based on Softmax function for image compression and coding. The embodiments herein produce exact discrete probability mass function for latent variables to be coded from side information. The probability mass function is likely to model the probability of the discrete latent variables more accurately at the expense of complexity. Therefore, entropy of the latent variables is expected to reduce. The embodiments herein enable training of the image processing system to minimize the bit rate at the same time.

Moreover, the embodiments herein create the possibility to encode ROI areas during coding. This may be done by using a ROI mask for coding the latent variables, for which variables within ROI areas are coded with the exact predicted probability, and those outside of ROI areas are taken the value of the highest probability. The ROI mask may then be encoded with CABAC.

The embodiments herein create a possibility to encode the ROI efficiently not only for the proposed system but also for the prior art architectures described in the background.

Therefore, the embodiments herein provide an improved system and method for image compression and coding.

BRIEF DESCRIPTION OF THE DRAWINGS

Examples of embodiments herein are described in more detail with reference to attached drawings in which.

DETAILED DESCRIPTION

Figure 1:
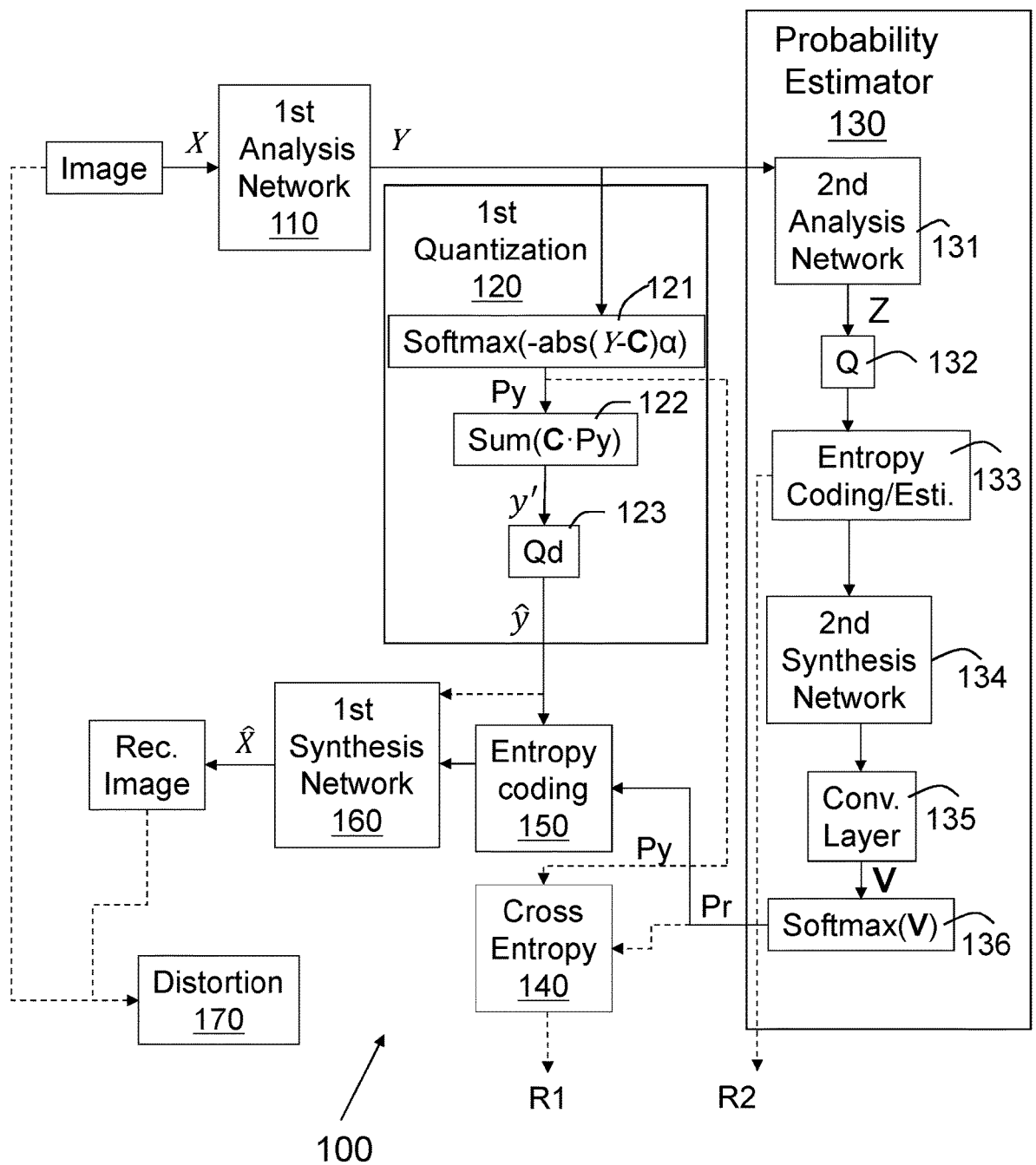
FIG. 1 is a schematic block overview illustrating an image processing system according to embodiments herein.

FIG. 1 shows an image processing system 100 for compressing and coding an image according to embodiments herein. In overall, the image processing system 100 has a hierarchical auto-encoder structure. With a two-layer structure, it is essentially a first auto-encoder with each latent variable predicted by using a second auto-encoder from a further compressed latent variable. The analysis network and the synthesis network in general consist of a few layers of convolutional layers and nonlinear layers, e.g., Generalized Divisive Normalization (GDN), and Rectified Linear Unit (ReLU).

Figure 2:
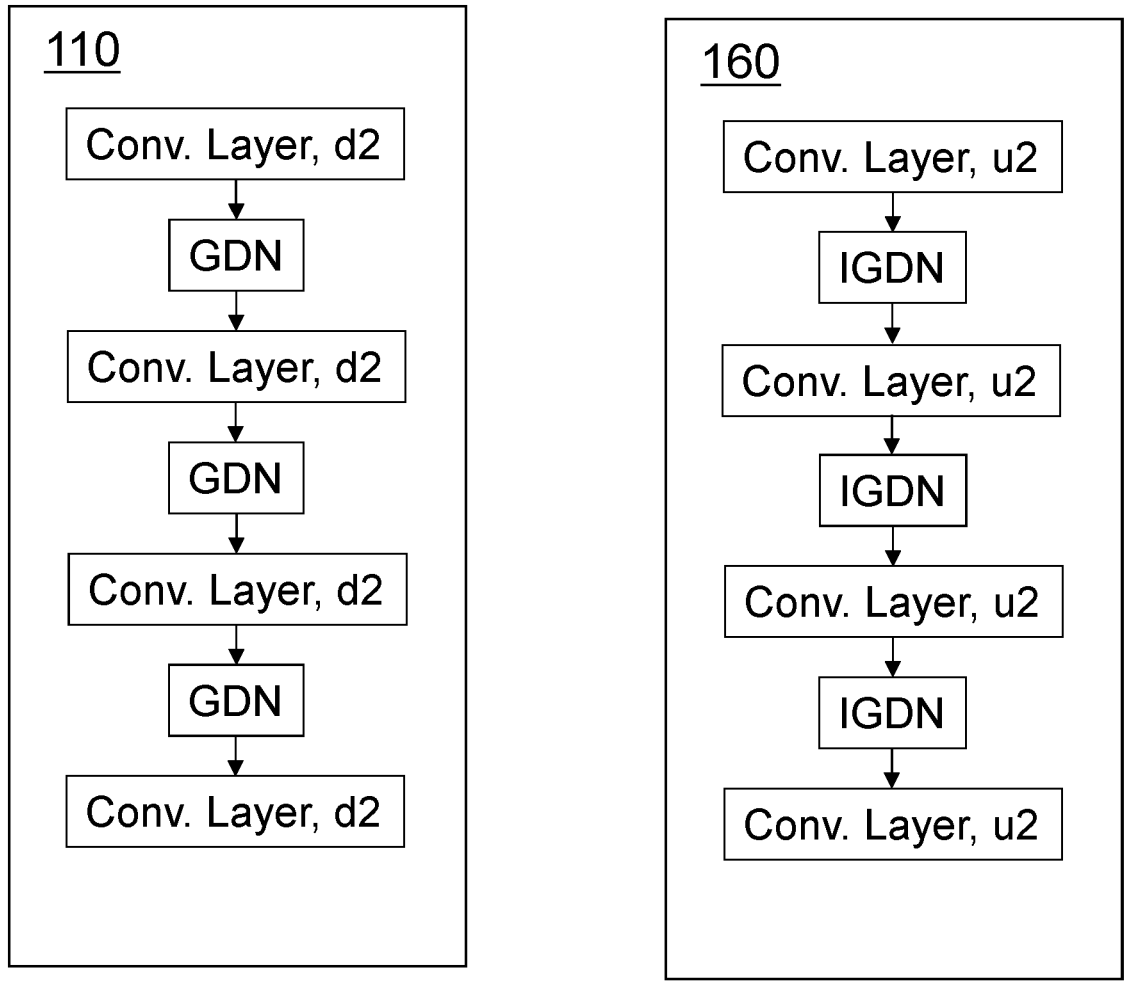
FIG. 2 (a) (b) (c) (d) are schematic block views illustrating structures of analysis and synthesis networks.
Figure 2:
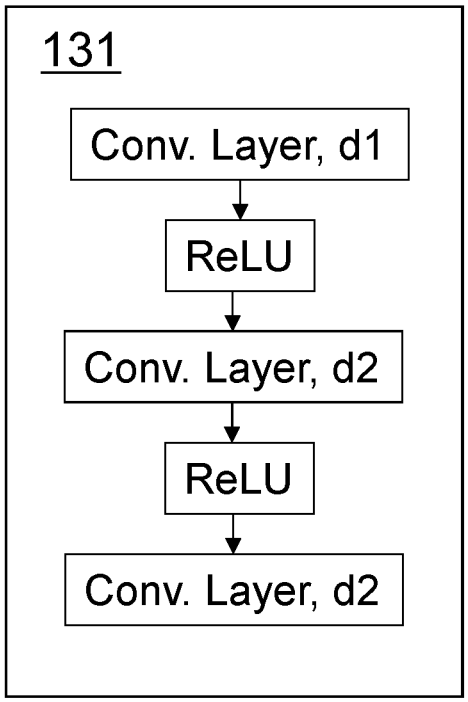
Figure 2:
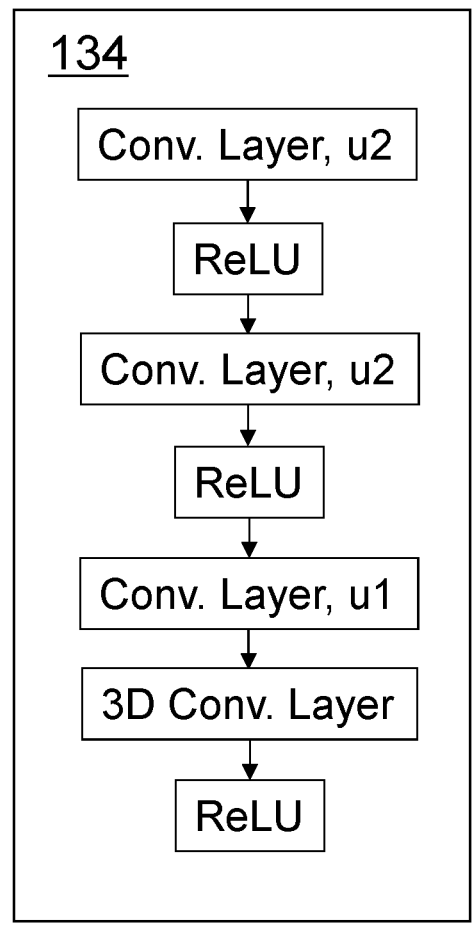

The image processing system 100 comprises a first analysis network 110 configured to generate a multidimensional matrix Y with compressed latent variables $y_i$, $Y(y_i)$, from an image X wherein i is an index of an element $y_i$ in matrix Y. The first analysis network 110 may consist of a few layers of convolutional layers and nonlinear layers. An example of the first analysis network 110 is shown in FIG. 2 (a), which implements Convolutional Neural Network(CNN) layers and Generalized Divisive Normalization (GDN), a type of transformation that has been shown to be particularly suitable for density modeling and compression of images. In the figure, down-sampling by 2 is denoted as d2, and up-sampling by 2 is as u2.

The image processing system 100 further comprises a first quantization unit 120 which is a deterministic quantization with uniform integer n levels, $$C = \left\{ -\left\lfloor \frac{n}{2} \right\rfloor \ldots -2, -1, 0, 1, 2 \ldots \left\lfloor \frac{n}{2} \right\rfloor - 1 \right\}.$$

The first quantization unit 120 comprises a Softmax function unit 121 configured to generate a vector of normalized probability $P_y(P_{yi})$ indicating the probabilities of rounding a latent variable $y_i$ to each of the n quantization levels.

Each latent variable $y_i$ in Y, its probability $P_{yi}$ is calculated by using the Softmax function:

$$P_{y_i} = S(x) = \frac{e^{x_i}}{\sum_{j=1}^{n} e^{x_j}}, \text{ where } x = -\text{abs}(y_i - C)\alpha,$$

n is the number of quantization levels, $y_i \in Y$, $0 << i < |Y|$, and x is a vector that consists of elements $x_j$, $1 << j << n$. For 2D image inputs with an auto-encoder, Y is a three-dimensional matrix, and for simplicity without confusion, each element in a multidimensional matrix in this document is represented with a one-dimensional index i e.g., as $y_i$ in Y. The vector C contains integer quantization levels, e.g., C=[−128,−127, ..., 0, ..., 126, 127] for quantization levels of n=256. For each $y_i$, the Softmax function produces a vector of normalized probability $P_{yi}$ in $P_y$ indicating the probabilities of rounding $y_i$ to its nearest quantization level and to other levels. Ideally, it is one for the nearest level and zero for other levels. However, when the value of a latent variable lies near the middle of two quantization levels, discrepancy can occur, which will be shown quantitatively in the experimental setup section later on. However, in general, the parameter a controls the hardness of this process. The higher the a is, the more accurate it is to quantize a latent variable to its nearest level.

The first quantization unit 120 further comprises a summer 122 configured to sum up a multiplication of each of the n quantization levels with each normalized probability $P_{yi}$ to generate a pre-quantized value for each of the latent variables, i.e. $y'_i = \Sigma_{i=1}^{n} C \cdot P_{yi}$. So each pre-quantized latent variable $y'_i$ is obtained by summing up elementwise the multiplication of the n quantization levels in C and the normalized probabilities $P_{y_i}$.

In order to perform operations on the matrix level for unit 121 and 122, Y and C need to be expanded to an appropriate dimension. For example, assuming Y is of dimension 16×16×192 and C of 1×256, they are both expanded to 16×16×192×1 and 16×16×192×256, respectively. The subtraction of a scalar by a vector is defined in this document as subtraction of the scalar by each element of the vector, which will in turn produce a vector.

The first quantization unit 120 further comprises a processing unit $Q_d$ 123. The processing unit $Q_d$ 123 is a final quantization process and has a function of $\hat{y}$=Stop_gradient (Round(y')−y')+y'. In the forward pass of the computation, $\hat{y}$=Round(y'), where Round( ) is a rounding operator on y' to its nearest integer. In the backward propagation, $\hat{y}$=y', which is due to the Stop_gradient operator.

Therefore the processing unit $Q_d$ 123 is configured to generate final quantized latent variables by rounding the pre-quantized value of the latent variable $y'_i$ to its nearest integer quantization level, i.e. $\hat{y}$=Round(y'), in forward computation during training process and actual compressing and encoding process, or taking the pre-quantized value of the latent variables $y'_i$ as the final quantized value of the latent variables i.e. $\hat{y}$=y', during training process with backward gradient propagation.

The image processing system 100 further comprises an entropy coding unit 150 configured to encoding or decoding the finale quantized latent variable $\hat{y}_i$ during actual compressing and encoding process.

The image processing system 100 further comprises a first synthesis network 160 configured to generate a reconstructed image from the finale quantized latent variables $\hat{y}_i$ during training process or from the encoded latent variables $\hat{y}_i$ during actual compressing and encoding process. The first synthesis network 160 may comprises a few layers of convolutional layers and nonlinear layers, e.g. CNN and Inversed Generalized Divisive Normalization (IGDN) layers, as shown in FIG. 2 (b).

The image processing system 100 further comprises a probability estimator 130 which forms the second auto-encoder. The probability estimator 130 comprises a second analysis network 131 configured to generate a matrix Z with latent variables $z_j$, $Z(z_j)$, further compressed from the Y matrix with the latent variables $y_i$. The second analysis network 131 may comprises a few layers of convolutional layers and ReLUs, as shown in FIG. 2 (c). It progressively down samples the latent variables from each CNN layer in the first analysis network 110.

The probability estimator 130 further comprises a quantization unit 132 configured to quantize the further compressed latent variables $z_i$ by adding uniform random noise with an interval, e.g. [−0.5, 0.5].

The probability estimator 130 further comprises an entropy coding and estimation unit 133 configured to encode the quantized latent variables $z_i$ during actual compressing and encoding process or estimate the probability of the latent variables $z_i$ during training process by using a fully factorized entropy model or by using its neighbouring pixels with a mask CNN. The entropy coding/estimation unit 133 may employ a fully factorized entropy model, i.e., to estimate the marginal probability and model the density of the quantized variable with a parametric or nonparametric model to estimate the bitrate.

The probability estimator 130 further comprises a second synthesis network 134. The second synthesis network 134 may comprises a few layers of convolutional layers and ReLUs, as shown in FIG. 2 (d).

The probability estimator 130 further comprises a convolution layer 135. The convolution layer 135 may either be a 2D or 3D CNN. The second synthesis network 134 together with the convolution layer 135 are configured to reconstruct a discrete probability distribution $V(V_i)$ for each latent variable $y_i$ and generate the probabilities for the n quantization levels for each latent variable $y_i$. The number of elements $V_i$ in Vis equal to the number of quantization levels n.

The probability estimator 130 further comprises a normalization unit 136 configured to normalize the reconstructed probability distribution by using a Softmax function and generate each normalized probability mass function $P_{r_i}$ in $P_r$, $P_r(P_{r_i})$, for encoding the final quantized latent variables $\hat{y}_i$. The normalized probability mass functions $P_r(P_{r_i})$ are generated from the side information Z.

For training process, the image processing system 100 further comprises a cross entropy estimator 140 configured to calculate a first bitrate R1 as a sum of the cross entropy of $P_{y_i}$ and $P_{r_i}$ for all latent variables $y_i$ during training process, i.e.

$$R1 = -\Sigma_{i=1}^{|Y|}\Sigma_{j=1}^{n}(P_{yi(j)}\log(P_{ri(j)}))$$

The image processing system 100 further comprises a distortion calculator 170 configured to calculate a distortion D from the original image X and the reconstructed image $\hat{X}$ during training process.

The parameters of the image processing system 100 are optimized with a rate-distortion function by training process. The parameters may include the weights of the neural networks and the parameters of any parametric models, e.g., for probability density approximation of Z.

Figure 3:
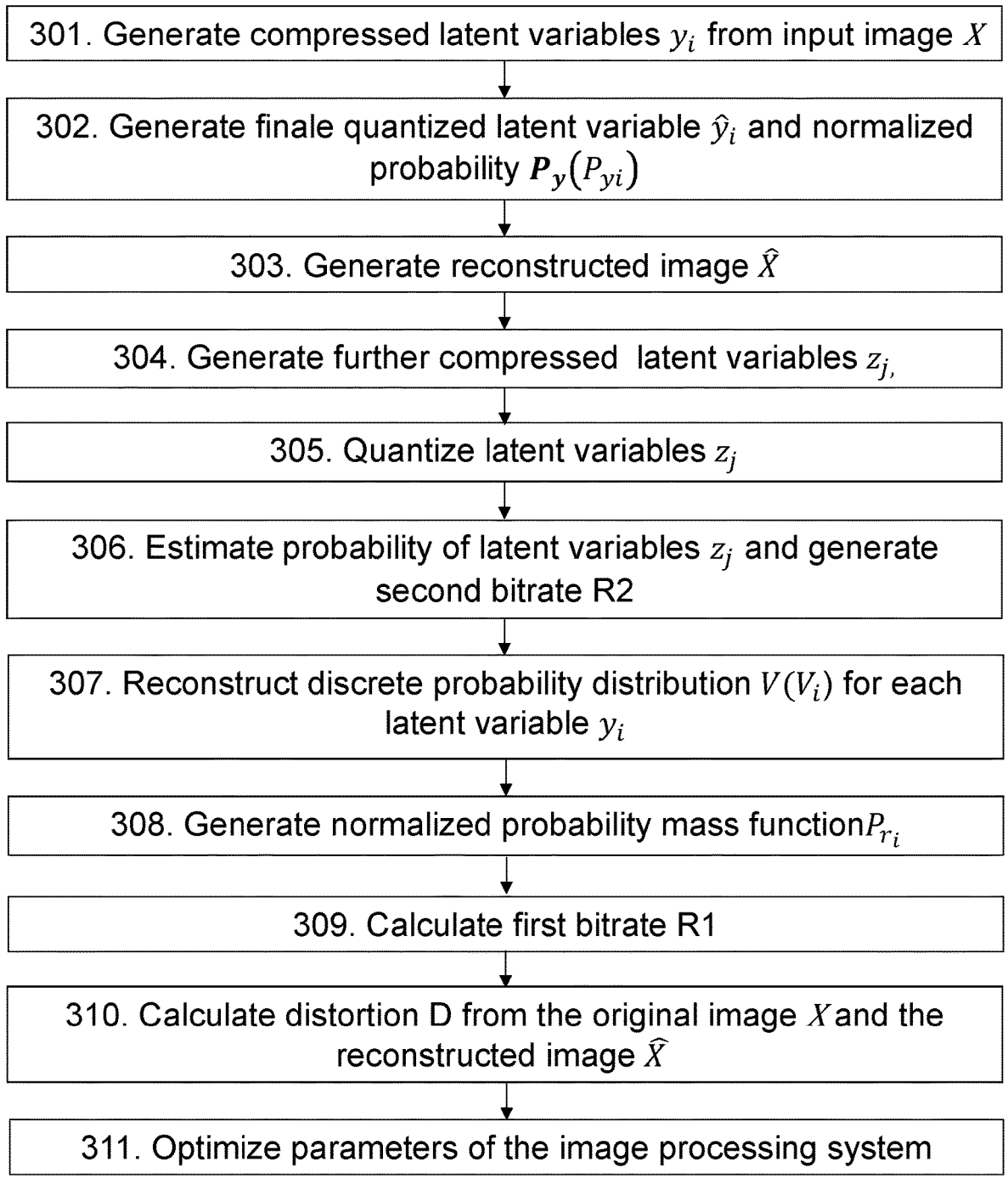
FIG. 3 is a flow chart illustrating a method for training the image processing system according to embodiments herein.

A method performed in the image processing system 100 for optimizing its parameter according to embodiments herein will be described with reference to FIG. 3. The method comprises the following actions which may be performed in any suitable order.

Action 301
Training data representing an image X is input to the first analysis network 110 to generate the compressed latent variables $y_i$, $Y(y_i)$.

Action 302
The compressed latent variables $y_i$ are quantized by the first quantization unit 120 to generate finale quantized latent variables $y_i$. A vector of normalized probabilities $P_y(P_{yi})$ indicating the probabilities of rounding a latent variable $y_i$ to its nearest quantization level and other levels is also generated by the Softmax function unit 121 in the first quantization unit 120. A pre-quantized latent variable $y'_i$ is obtained by summing up elementwise multiplication of the n quantization levels in C and the normalized probabilities $P_{yi}$ for each of the latent variables $y_i$, then the finale quantized latent variables $\hat{y}_i$ are generated by rounding each pre-quantized value of the latent variable $y'_i$ to its nearest integer quantization level, i.e. $\hat{y}=\text{Round}(y')$.

Action 303
The finale quantized latent variables $\hat{y}_i$ are input to the first synthesis network 160 to generate a reconstructed image $\hat{X}$.

Action 304
The compressed latent variables $y_i$ in $Y(y_i)$ is further compressed in the second analysis network 131 to generate latent variables $z_j$ in matrix Z, $Z(z_j)$.

Action 305
The latent variables $z_j$ is quantized in the quantization unit 132.

Action 306
The probability of the latent variables $z_j$ is estimated in the entropy coding/estimation unit 133 and a second bitrate R2 is generated. R2 may be calculated by the entropy coding/estimation unit 133 with a fully factorized model or with a conditional model from its neighbours.

Action 307
A discrete probability distribution $V(V_i)$ for each latent variable $y_i$ is reconstructed by the second synthesis network 134 together with the convolution layer 135 from the estimated probability of the latent variables $z_j$. The probabilities for the n quantization levels for each latent variable $y_i$ are also generated.

Action 308
The reconstructed probability distribution $V(V_i)$ is normalized by using a Softmax function and generate a normalized probability mass function $P_{r_i}$ in $P_r$, $P_r(P_{r_i})$, for each latent variable $y_i$.

Action 309
The first bitrate R1 is calculated in the cross entropy estimator 140 as a sum of the cross entropy of $P_{y_i}$ and $P_{r_i}$ for all latent variables $y_i$.

Action 310
A distortion D is calculated from the original image X and the reconstructed image $\hat{X}$ in the distortion calculator 170. The distortion D may be calculated as e.g., Mean Square Error (MSE), from the original image and the reconstructed image.

Action 311
The parameters of the image processing system 100 are optimized by adjusting their values to minimize R1 or $\lambda D+R1+R2$. The parameters may be optimized by using a gradient decent method with backpropagation and include the weights of the first and second analysis networks, the weights of the first and second synthesis networks and the parameters of any parametric models, e.g., for probability density approximation of the further compressed latent variables $z_j$ etc.

According to some embodiments herein, the rate-distortion function is to minimize $\lambda D+R1+R2$, where $\lambda$ is a coefficient controlling the rate-distortion optimization.

Figure 4:
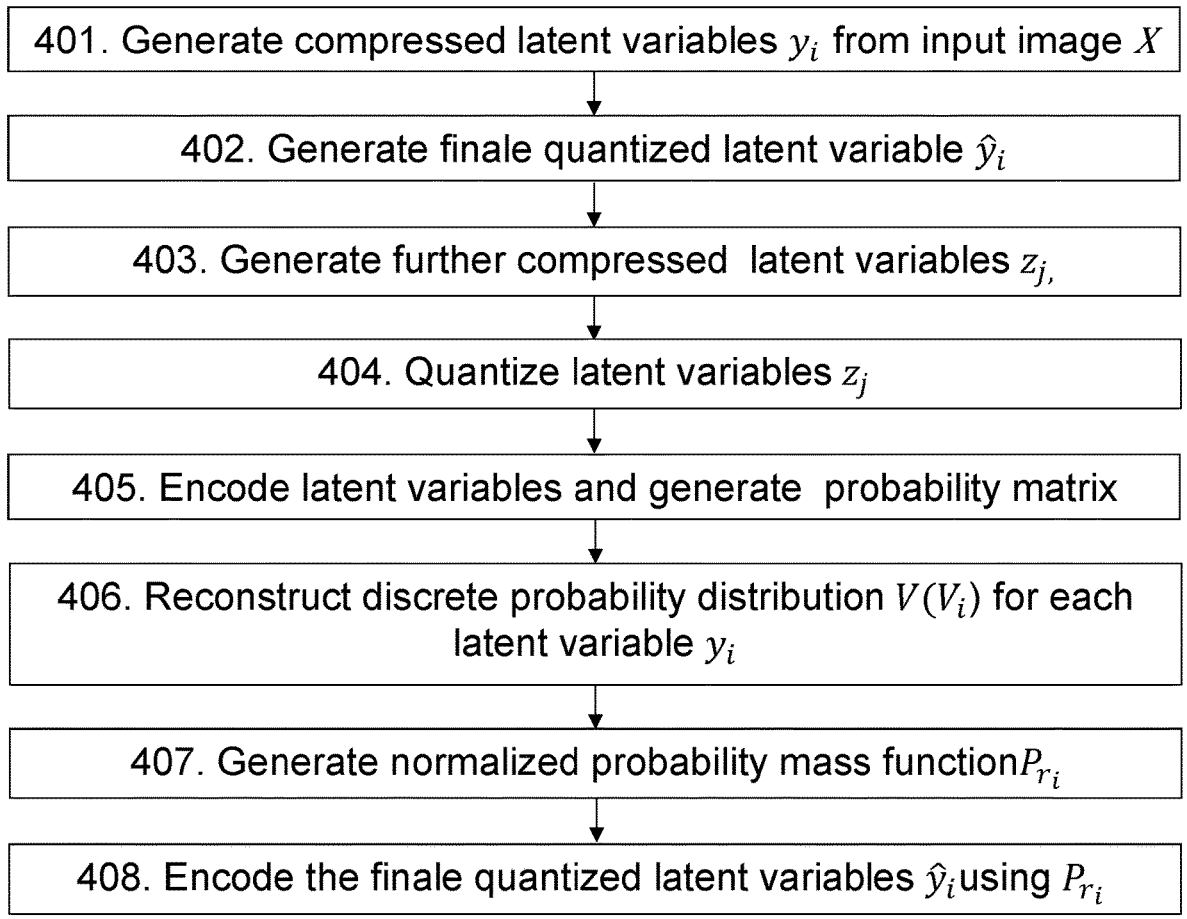
FIG. 4 is a flow chart illustrating a method performed in the image processing system for encoding an image according to embodiments herein.

After training and optimizing process, the image processing system 100 is ready for actual compressing and coding process. A method performed in the image processing system 100 for compressing and coding will be described with reference to FIG. 4. The method comprises the following actions which may be performed in any suitable order.

Action 401
An image X is input to the first analysis network 110 to generate compressed latent variables $y_i$, $Y(y_i)$.

Action 402
The compressed latent variables $y_i$ are quantized by the first quantization unit 120 to generate finale quantized latent variable $y_i$. A vector of normalized probabilities $P_y(P_{yi})$ indicating the probabilities of rounding a latent variable $y_i$ to its nearest quantization level and other levels is generated by the Softmax function unit 121 in the first quantization unit 120. A pre-quantized latent variable $y'_i$ is obtained by summing up elementwise multiplication of the n quantization levels in C and the normalized probabilities $P_{yi}$ for each of the latent variables $y_i$, then the finale quantized latent variables $\hat{y}_i$ are generated by rounding each pre-quantized value of the latent variable $y'_i$ to its nearest integer quantization level, i.e. $\hat{y}=\text{Round}(y')$. The probabilities for the n quantization levels for each latent variable $y_i$ are generated.

Action 403

The compressed latent variables $y_i$ is further compressed in the second analysis network 131 to generate latent variables $z_j$ in matrix Z, $Z(z_j)$.

Action 404

The latent variables $z_j$ is quantized in the quantization unit 132.

Action 405

In the entropy coding/estimation unit 133, each latent variable $z_j$ in z is encoded losslessly first by using a range or arithmetical encoder with the estimated fully factorized entropy model. The probability matrix for the latent variables $z_j$ is then estimated from the encoded latent variables $Z(z_j)$ by using a mask CNN, in case the probability of each variable is estimated from its reconstructed neighbours.

Action 406

A discrete probability distribution $V(V_i)$ for each latent variable $y_i$ is reconstructed by the second synthesis network 134 together with the convolution layer 135 from the encoded latent variables $z_j$. The probabilities for the n quantization levels for each $y_i$ are also generated.

Action 407

The reconstructed probability distribution $V(V_i)$ is normalized by using a Softmax function and generate each normalized probability mass function $P_{r_i}$ in $P_r$, $P_r(P_{r_i})$ for each latent variable $y_i$. A probability mass function (PMF) is a function that gives the probability that a discrete random variable is exactly equal to a defined value. Sometimes it is also known as the discrete density function. A PMF differs from a probability density function (PDF) in that the latter is associated with continuous rather than discrete random variables. A PDF must be integrated over an interval to yield a probability.

Action 408

Subsequently, the finale quantized latent variables $\hat{y}_i$ are encoded in the entropy coding unit 150. Each final quantized variable $\hat{y}_i$ is encoded by using its corresponding $P_{r_i}$ as the PMF with a range or arithmetical encoder.

The minimum and the maximum values of 9 may be calculated and limits the symbols, i.e. the quantization levels, to be encoded within the interval of the min-max values, and only convert the Probability Mass Function (PMF) to Cumulative Distribution Function (CDF) within the interval. The CDF is the probability that a variable takes a value less than or equal to a defined value. In addition, the min and max values need to be encoded.

Furthermore, it is possible to limit the span of symbols within the interval of each PMF for the coding, and also with an adaptive binary arithmetical coding engine.

Therefore according to some embodiments herein, the entropy coding unit 150 may be further configured to calculate the minimum and the maximum values of the final quantized latent variables $\hat{y}_i$ and limit the probability distribution for the actual final quantized latent variables $\hat{y}_i$ to be encoded within the interval of the minimum and maximum values.

According to some embodiments herein, the entropy coding unit 150 may be further configured to convert the PMF $P_r(P_{r_i})$ to Cumulative Mass Function (CMF) within the interval of the minimum and maximum values and encode the minimum and maximum values.

According to some embodiments herein, the entropy coding unit 150 may be configured to limit the interval of the distribution for PMF for coding the final quantized latent variables $\hat{y}_i$.

According to some embodiments herein, the entropy coding unit 150 may be configured to encode the final quantized latent variables $\hat{y}_i$ with an adaptive arithmetical or range coding engine or an adaptive binary arithmetical coding engine.

Figure 5:
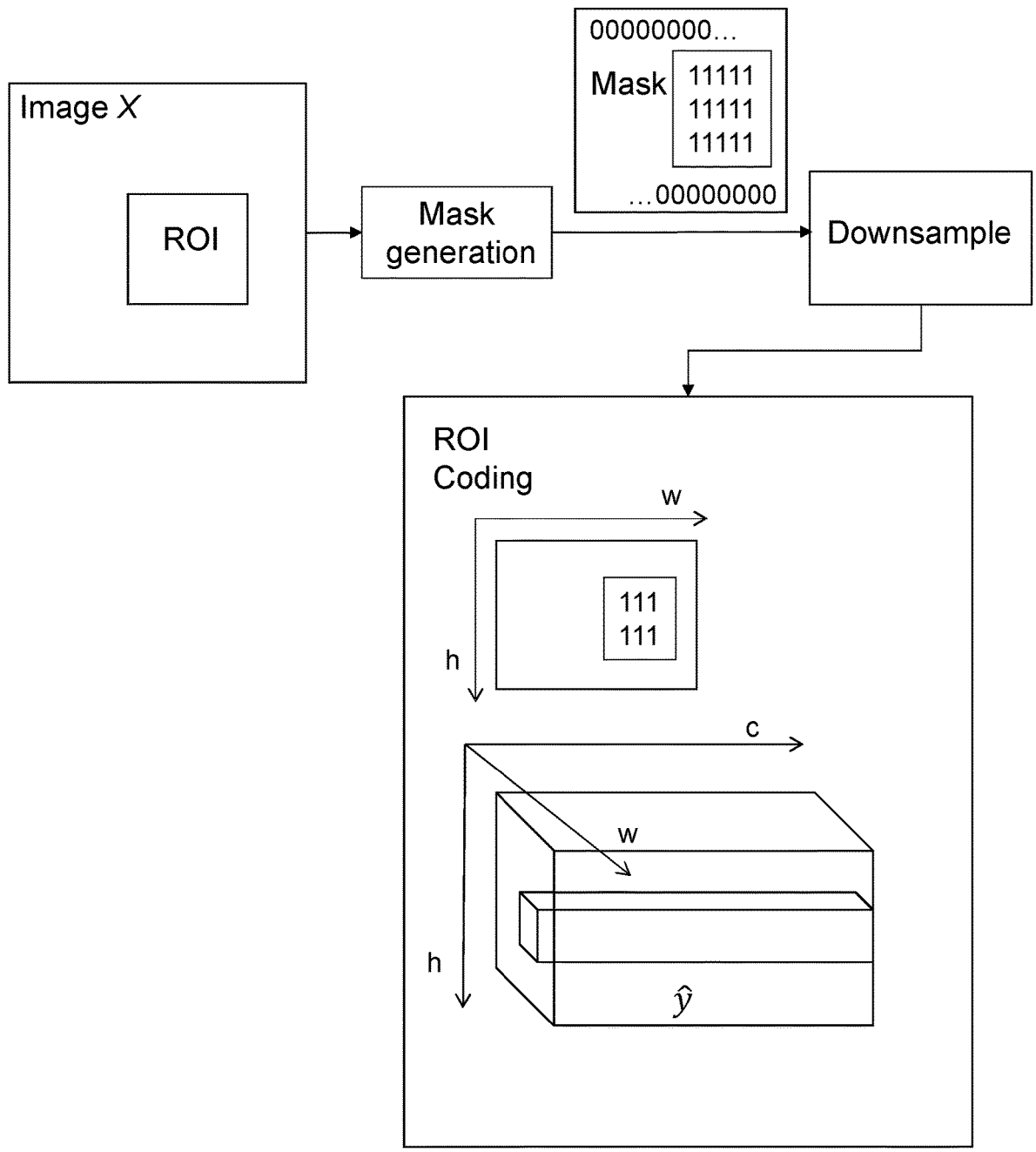
FIG. 5 is a schematic block view illustrating ROI coding according to the embodiments herein.

According to some embodiments herein, one or more ROI areas may be identified in the image X The representation of an ROI may be a ROI mask containing zero and one values representing which image pixels belong to the ROI, where value one represents that the corresponding image pixels belong to the ROI. This is illustrated in FIG. 5. The representation of an ROI may also be four coordinates of an ROI box, or parameters that describe a certain shape of an ROI. The CABAC engine may be used to encode the representation of an ROI.

As shown in FIG. 5, an ROI mask may be generated. The ROI mask is then down-sampled, e.g., to the spatial size of the latent space, and encoded by using the CABAC engine. The coding of the ROI mask can be performed in a raster-scan order after encoding the latent variables. In another example, the representation of ROI regions can be coded without using a mask, e.g., only encode the four coordinates of an ROI box or the parameters that describe a certain shape of an ROI.

The coding of latent variable z remains unmodified. The down-sampled mask is then utilized to encode the quantized latent variables $\hat{y}$. For each $\hat{y}_i$ within the ROI area, $\hat{y}_i$ is encoded with its corresponding probability $P_{r_i}$. For each $\hat{y}_i$ outside of ROI, it can be handled in the following ways:

$\hat{y}_i$ can be discarded completely.

If the distance between $\hat{y}_i$ and the value with the highest probability in $P_{r_i}$ is less than a threshold, $\hat{y}_i$ can be discarded. Otherwise, $\hat{y}_i$ is encoded with its corresponding probability $P_{r_i}$ and the corresponding bit in the ROI mask is changed to one.

Therefore, according to some embodiments herein, the ROI mask may be down-sampled during encoding and is then utilized to encode the final quantized latent variables $\hat{y}_i$ by using CABAC engine. For each final quantized latent variable $\hat{y}_i$ within the ROI, $\hat{y}_i$ is encoded with its corresponding probability $P_{r_i}$, for each $\hat{y}_i$ outside of the ROI, $\hat{y}_i$ is either discarded or if the distance between $\hat{y}_i$ and the value with the highest probability in $P_{r_i}$ is less than a threshold, $\hat{y}_i$ is discarded, otherwise $\hat{y}_i$ is encoded with its corresponding $P_{r_i}$ and the corresponding bit in the ROI mask is changed to one.

To evaluate the performance of the image processing system 100, the encoded latent variables $\hat{y}_i$ are decoded and input to the first synthesis network 160 to generate a reconstructed image $\hat{X}$. The decoding process follows the same order as the encoding with the latent variables z to be decoded first. Next, the probability matrix $P_r$ is estimated from z, and each element $P_{r_i}$ is supplied to the entropy coding engine to decode the corresponding variables $\hat{y}_i$ from the coded bit stream.

The ROI mask and the latent variable z are decoded correspondingly. For each zero value in the ROI mask, the value with the highest probability in $P_{r_i}$ is taken as the corresponding $\hat{y}_i$. For the methods in prior art, an estimated mean may be assigned to $\hat{y}_i$. For each one value in the ROI mask, the decoding process is unmodified.

The image is reconstructed with the first synthesis network 160 from the decoded 9, and the ROI mask is up-sampled to the size of the reconstructed image. Subsequently, for the image pixels outside of the ROI area, a smoothing filter may be applied to remove any unpleasant artifacts.

To demonstrate the performance of the image processing system 100, experiment and simulation are setup. The quantization parameter a is set to 20. The size and the channels of the networks are set as follows: the first analysis network 110 (5×5×K, 5×5×K, ×5×K, 5×5×L), the second analysis network 131 (3×3×K, 5×5×K, 5×5×K), the first synthesis network 160 (5×5×K, 5×5×K, 5×5×K, 5×5×K), and the second synthesis network 134 (5×5×K, 5×5×K, 3×3×L, 5×5×5×n). The K and L are 128 and 192 except for the highest bit rate, for which they are 192 and 320, respectively. A range encoder is applied for the entropy coding. Images from ImageNet with a size larger than 250 are collected for training. In addition, the quantization level n is set to 256 from −128 to 127 except for the highest bitrate, which is assigned to 320. The evaluation is performed over the Kodak image set, and the PSNR versus bitrate are aggregated over the entire image set. The results are compared to the BPG image encoder. The MSE is applied as the distortion metric, and the objective metric PSNR is utilized for the quality measurement because BPG is also optimized for PSNR.

Figure 6:
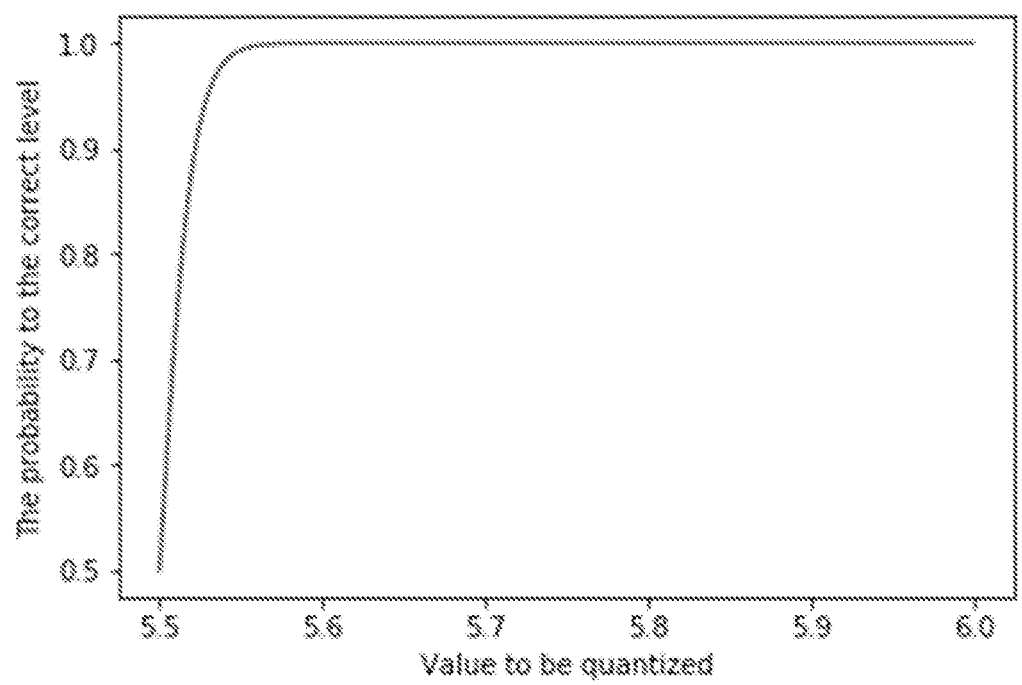
FIG. 6 is diagram illustrating an example of quantization inaccuracy.

In addition, for the quantization process as mentioned before, mismatch exists between the quantized latent variable from $Q_d$ 123 and the probability generated by Softmax function. This happens when a quantized value falls within a certain interval in the middle of two quantization levels. An example for a latent variable taken the value from 5.5 to 6 and with a=100 is illustrated in FIG. 6. There is a small interval that the probability of being quantized to 6 is below one, i.e., between 0.5 to 1. This creates a sub-optimal distribution for the probability estimator to learn for a small portion of data. Furthermore, this parameter also affects training of the analysis network. The parameter a controls this interval, i.e. the quantization precision. The larger is a, the narrower the interval. However, a large a does not improve the compression efficiency, partly because the size of the side information Z is very small, which can only provide the estimation of $P_r$ to a certain precision. In addition, a large a may affect the analysis network with more gradient contribution from the cross entropy optimization, and in the end, this can reduce the reconstruction quality.

Figure 7:
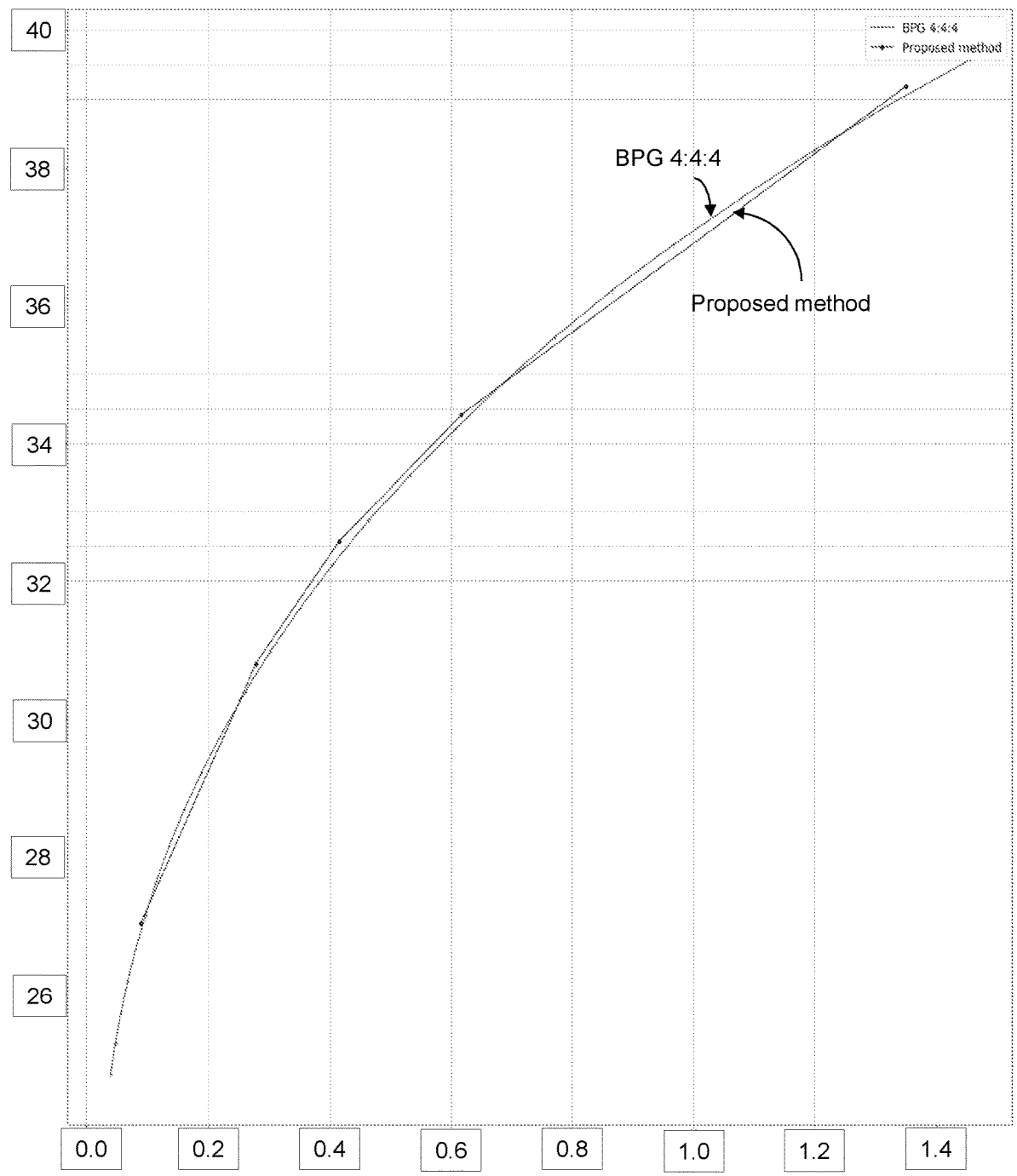
FIG. 7 is diagram illustrating PSNR for the method according to embodiments herein versus BPG.

It is illustrated in FIG. 7 that the compression efficiency of the proposed method according to embodiments herein is on par with BPG (4:4:4), and the proposed method slightly outperforms BPG for all the tested bitrate points.

Figure 8:
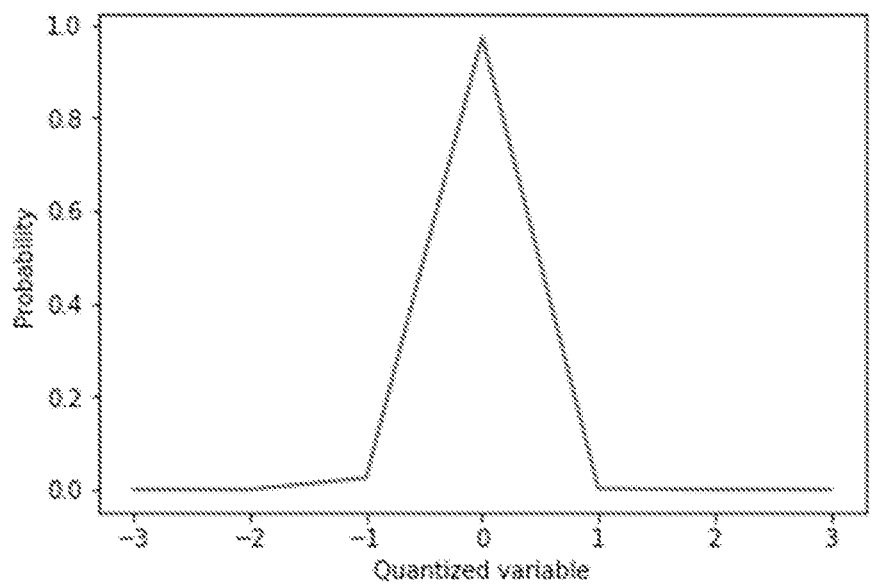
FIG. 8 is diagram illustrating probability mass function learned by a probability estimator in the image processing system according to embodiments herein for a quantized variable.

Furthermore, the probability distribution learned by the probability estimator 130 for a selected latent variable is shown in FIG. 8. Neither Gaussian nor Laplace distribution can model this precisely.

Figure 9:
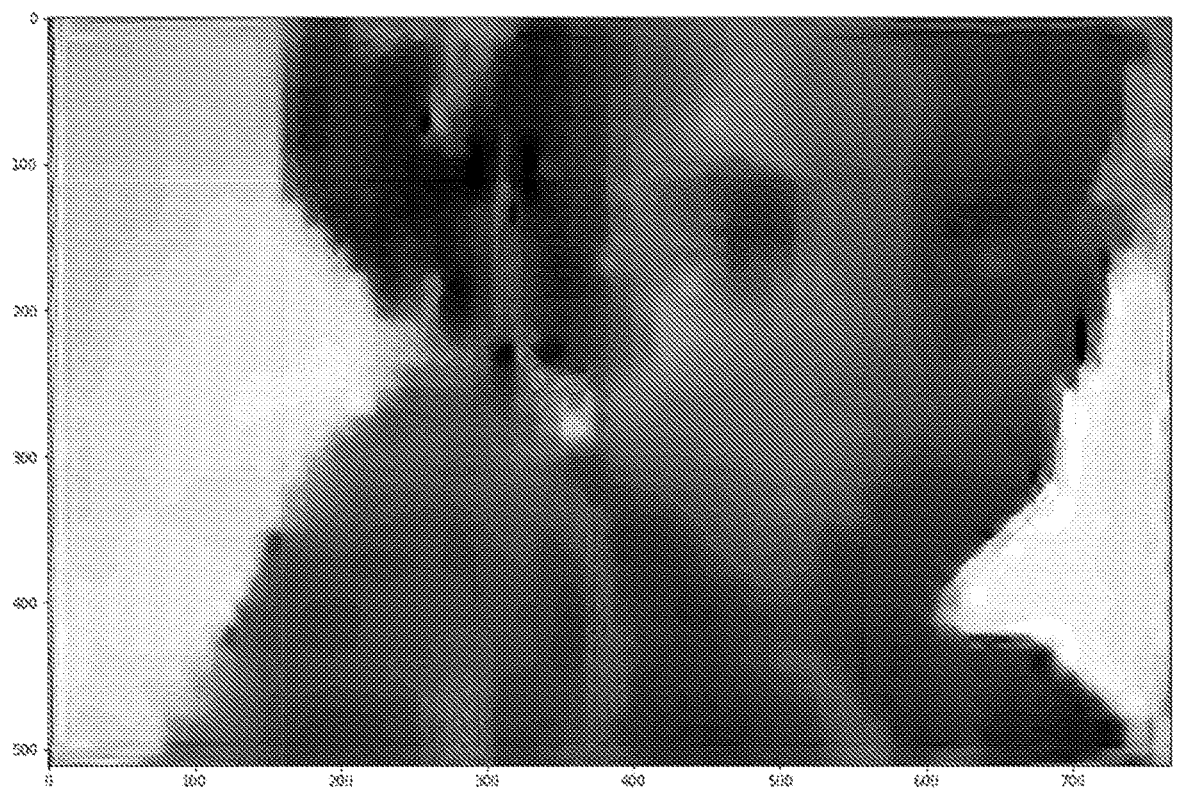
FIG. 9 (a) is an Image from Kodak dataset reconstructed with ROI mask of all zero on the portrait and (b) is with a rectangular ROI on the portrait.
Figure 9:
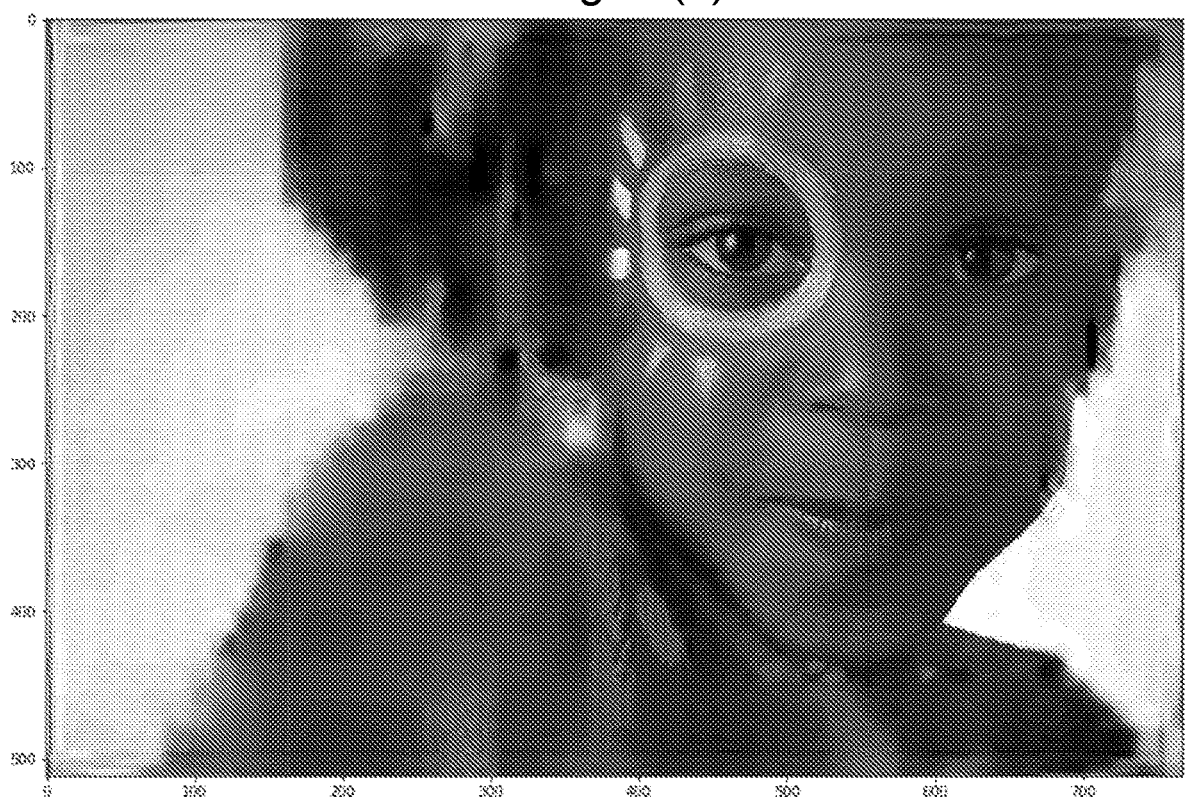

An image reconstructed with the ROI mask of all zero is depicted in FIG. 9a, and the size of the compressed data for the image part is 672 bytes. It shows that the reconstructed image resembles a low-pass filtered version of the original image. Another image reconstructed with the ROI on the face of a portrait is shown in FIG. 9b with a compressed data of 3590 bytes. It shows a natural transition from the ROI to the NON-ROI areas.

To summarize, the image processing system 100 and method therein for compressing and coding an image according to embodiments herein provide a simplified uniform deterministic quantization method with integer levels based on Softmax function. The probability mass function is likely to model the probability of the discrete latent variables more accurately at the expense of complexity. Therefore, entropy of the latent variables is expected to reduce.

For the forward pass computation, i.e. passing the input image through all the computational operations from the first block to the last block of the image processing system 100, the proposed method is more efficient than prior art solutions. For example, in F. Mentzer et al., an Argmin( ) operation is used, which implies a search process. In addition, it utilizes a one-hot-key coding to the index of a quantized symbol to obtain the target probability, which is to be learned from the reconstructed neighboring pixels. The one-hot-key coding process is not differentiable. Therefore, the analysis network will not learn to produce latent variables that are favorable for the context network to model. In the proposed approach, the probability for a target quantized variable to be learned is produced by the Softmax function. Therefore, it is possible for the analysis network to learn to produce probabilities for quantized variables, which minimize the cross entropy with the learned probability from the probability estimator.

The embodiments herein provide optimizing process with learning from side information and enable the backpropagation to the analysis network for entropy reduction. Training of the image processing system 100 to minimize the bitrate was enabled at the same time. The embodiments herein produce exact discrete probability mass function for latent variables to be coded from side information.

The proposed system and method outperform BPG for all the tested bitrate.

The proposed system and method further devises a method of encoding ROI efficiently for both the proposed image processing system 100 and for some of the prior art architectures. The embodiments herein create the possibility to encode ROI areas during coding. This is done by using a ROI mask for coding the latent variables, for which variables within ROI areas are coded with the exact predicted probability, and those outside of ROI areas are taken the value of the highest probability. The ROI mask is then encoded with CABAC.

Figure 10:
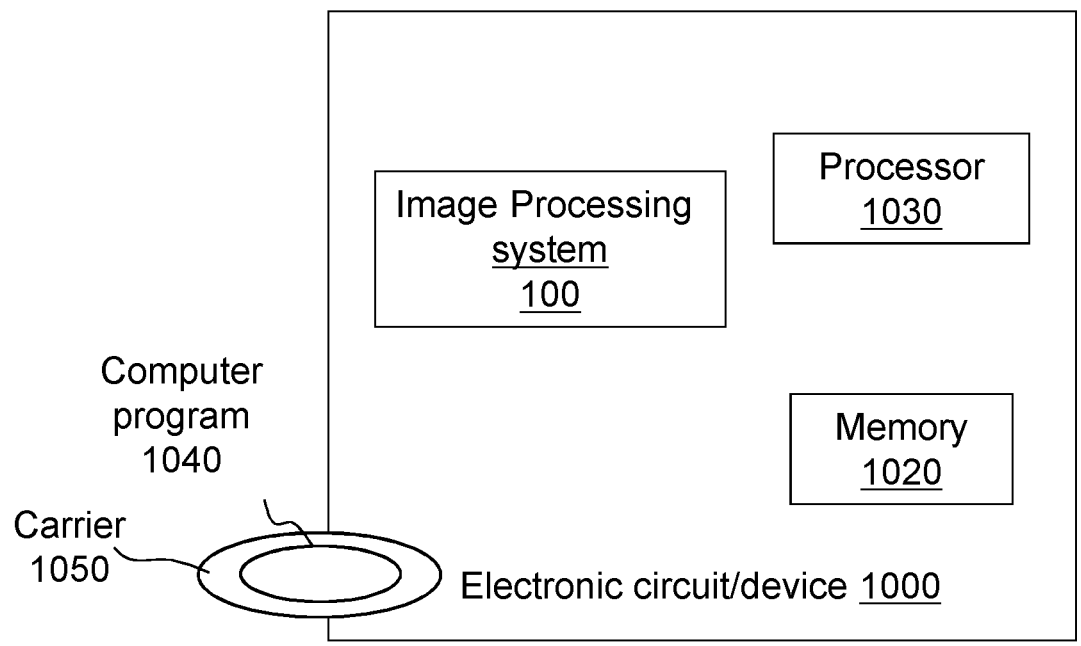
FIG. 10 is a block diagram illustrating an electronic device in which the image processing system according to embodiments herein is implemented.

The image processing system 100 according to the embodiments herein may be employed in various electronic circuits or device, which may be any one of a computer, a mobile phone, a video camera, an embedded device or an Application Specific Integrated Circuit, ASIC, chip. FIG. 10 shows a block diagram for an electronic device 1000. The electronic device 1000 may comprise other units, where a memory 1020, a processor 1030 are shown.

Those skilled in the art will appreciate that the first analysis network 110, the first quantization unit 120, the probability estimator 130, the entropy coding unit 150, the cross entropy estimator 140, the first synthesis network 160, the distortion calculator 170 described above may be referred to one unit, a combination of analog and digital circuits, one or more processors, such as processor 1030 configured with software and/or firmware and/or any other digital hardware performing the function of each unit.

The embodiments herein may be implemented through one or more processors, such as the processor 1030 in the electronic device 1000 together with computer program code 1040 for performing the functions and actions of the embodiments herein. The program code 1040 may also be provided as a computer program product 1050, for instance in the form of a data carrier carrying computer program code for performing the embodiments herein when being loaded into the electronic device 1000. The computer program code may furthermore be provided as pure program code on a server or cloud and downloaded to the electronic device 1000.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. An image processing system for compressing and coding an image X, the image processing system comprising:
   a first analysis network configured to generate a multidimensional matrix $Y(y_i)$ with compressed latent variables $y_i$ from the image X, wherein i is an index of an element $y_i$ in matrix Y;
   a first deterministic quantization unit with n uniform integer quantization levels, the first deterministic quantization unit comprising:
      a Softmax function unit configured to generate a vector of normalized probabilities $P_y(P_{yi})$ indicating the probabilities of rounding a latent variable $y_i$ to each of the n quantization levels,
      a summer configured to sum up a multiplication of each of the n quantization levels with each of the normalized probabilities $P_{yi}$ to generate a pre-quantized latent variable $y'_i$ for each latent variable $y_i$,
      a processing unit configured to generate final quantized latent variables $\hat{y}_i$ by rounding each of the pre-quantized latent variable $y'_i$ to its nearest integer level, $\hat{y}$=Round (y'), in forward computation during training process and actual compressing and encoding process, or taking the pre-quantized latent variable $y'_i$ as the final quantized latent variable $\hat{y}_i$, $\hat{y}$=y', during training process with backward gradient propagation;
   an entropy coding unit configured to encode or decode the final quantized latent variables $\hat{y}_i$ during actual compressing and encoding process;
   a first synthesis network configured to generate a reconstructed image $\hat{X}$ from the final quantized latent variables $\hat{y}_i$ during training process or from the encoded latent variables $\hat{y}_i$ during actual compressing and encoding process;
   a probability estimator comprising:
      a second analysis network configured to generate a matrix $Z(z_j)$ with latent variables $z_j$ further compressed from the Y matrix with the latent variables $y_i$,
      a quantization unit configured to quantize the further compressed latent variables $Z_j$,
      an entropy coding and estimation unit configured to encode the quantized latent variables $z_i$ during actual compressing and encoding process or estimate the probability of the latent variables $z_i$ during training process;
      a second synthesis network together with a convolution layer configured to reconstruct a discrete probability distribution $V(V_i)$ for each latent variable $y_i$ and generate the probabilities for the n quantization levels for each latent variable $y_i$, and
      a normalization unit configured to normalize the reconstructed probability distribution by using a Softmax function and generate a normalized probability mass function $P_r(P_{r_i})$ for encoding the final quantized latent variables $\hat{y}_i$.

2. The image processing system according to claim 1, further comprising a cross entropy estimator configured to calculate a first bitrate R1 as a sum of the cross entropy of the probability $P_{y_i}$ and the normalized probability mass function $P_{r_i}$ for all the latent variables $y_i$ during training process.

3. The image processing system according to claim 1, further comprising a distortion calculator configured to calculate a distortion D from the original image X and the reconstructed image $\hat{X}$ during training process.

4. The image processing system according to claim 1, wherein the entropy coding unit is further configured to calculate the minimum and the maximum values of the final quantized latent variables $\hat{y}_i$; and limit the probability distribution for the actual final quantized latent variables $\hat{y}_i$ to be encoded within the interval of the minimum and maximum values.

5. The image processing system according to claim 4, wherein the entropy coding unit is configured to convert the probability mass function $P_{r_i}$ to Cumulative Mass Function within the interval of the minimum and maximum values and encode the minimum and maximum values.

6. The image processing system according to claim 4, wherein the entropy coding unit is configured to limit the interval of the distribution for the probability mass function for coding the final quantized latent variables $\hat{y}_i$.

7. The image processing system according to claim 1, wherein the entropy coding unit is configured to encode the final quantized latent variables $\hat{y}_i$ with an adaptive arithmetical or range coding engine or an adaptive binary arithmetical coding engine.

8. The image processing system according to claim 1, wherein one or more region of interest (ROI) areas are identified in the image X, and wherein the representation of an ROI is any one of a ROI mask containing zero and one values representing which image pixels belong to the ROI, four coordinates of an ROI box, or parameters that describe a certain shape of an ROI, and a Context Adaptive Binary Arithmetical Coding (CABAC) engine is configured to encode the representation of an ROI.

9. The image processing system according to claim 8, wherein the ROI mask is down-sampled during encoding and is then utilized to encode the final quantized latent variables $\hat{y}_i$ by using the CABAC engine.

10. The image processing system according to claim 9, wherein for each final quantized latent variable $\hat{y}_i$ within the ROI, $\hat{y}_i$ is encoded with its corresponding probability $P_{r_i}$, for each $\hat{y}_i$ outside of the ROI, $\hat{y}_i$ is either discarded or if the distance between $\hat{y}_i$ and the value with the highest probability in $P_{r_i}$ is less than a threshold, $\hat{y}_i$ is discarded, otherwise $\hat{y}_i$ is encoded with its corresponding $P_{r_i}$ and the corresponding bit in the ROI mask is changed to one.

11. The image processing system according to claim 8, wherein the ROI mask is up-sampled during decoding to the size of the reconstructed image, and for the image pixels outside of the ROI area, a smoothing filter is applied to remove any artifacts.

12. The image processing system according to claim 1, wherein parameters of the image processing system are optimized with a rate-distortion function by training process.

13. The image processing system according to claim 12, wherein the rate-distortion function is to minimize $\lambda D+R1+R2$, wherein D is a Mean Square Error from the original image and the reconstructed image, $\lambda$ is a coefficient controlling the rate-distortion optimization, R1 is the first bitrate calculated by the cross entropy estimator and R2 is a second bitrate calculated by the entropy estimation with a fully factorized model or with a conditional model from its neighbours.

14. An electronic device comprising an image processing system for compressing and coding an image X, wherein the image processing system comprises:

a first analysis network configured to generate a multidimensional matrix $Y(y_i)$ with compressed latent variables $y_i$ from the image X, wherein i is an index of an element $y_i$ in matrix Y;

a first deterministic quantization unit with n uniform integer quantization levels, the first deterministic quantization unit a Softmax function unit configured to generate a vector of normalized probabilities $P_y(P_{yi})$ indicating the probabilities of rounding a latent variable $y_i$ to each of the n quantization levels, a summer configured to sum up a multiplication of each of the n quantization levels with each of the normalized probabilities $P_{yi}$ to generate a pre-quantized latent variable $y'_i$ for each latent variable $y_i$, a processing unit configured to generate final quantized latent variables $\hat{y}_i$ by rounding each of the pre-quantized latent variable $y'_i$ to its nearest integer level, $\hat{y}$=Round ($y'$), in forward computation during training process and actual compressing and encoding process, or taking the pre-quantized latent variable $y'_i$ as the final quantized latent variable $\hat{y}_i$, $\hat{y}=y'$, during training process with backward gradient propagation;

an entropy coding unit configured to encode or decode the final quantized latent variables $\hat{y}_i$ during actual compressing and encoding process;

a first synthesis network configured to generate a reconstructed image $\hat{X}$ from the final quantized latent variables $\hat{y}_i$ during training process or from the encoded latent variables $\hat{y}_i$ during actual compressing and encoding process;

a probability estimator comprising:

a second analysis network configured to generate a matrix $Z(z_j)$ with latent variables $z_j$ further compressed from the Y matrix with the latent variables $y_i$, a quantization unit configured to quantize the further compressed latent variables $z_j$, an entropy coding and estimation unit configured to encode the quantized latent variables $z_j$ during actual compressing and encoding process or estimate the probability of the latent variables $z_j$ during training process;

a second synthesis network together with a convolution layer configured to reconstruct a discrete probability distribution $V(V_i)$ for each latent variable $y_i$ and generate the probabilities for the n quantization levels for each latent variable $y_i$, and a normalization unit configured to normalize the reconstructed probability distribution by using a Softmax function and generate a normalized probability mass function $P_r(P_{ri})$ for encoding the final quantized latent variables $\hat{y}_i$.

15. The electronic device according to claim 14, wherein the electronic device is any one of a computer, a mobile phone, a video camera, an embedded device or an Application Specific Integrated Circuit (ASIC) chip.

16. The electronic device according to claim 14, wherein the image processing system further comprises a cross entropy estimator configured to calculate a first bitrate R1 as a sum of the cross entropy of the probability $P_{y_i}$ and the normalized probability mass function $P_{r_i}$ for all the latent variables $y_i$ during training process.

17. The electronic device according to claim 14, wherein the image processing system further comprises a distortion calculator configured to calculate a distortion D from the original image X and the reconstructed image $\hat{X}$ during training process.

18. The electronic device according to claim 14, wherein the entropy coding unit is further configured to calculate the minimum and the maximum values of the final quantized latent variables $\hat{y}_i$ and limit the probability distribution for the actual final quantized latent variables $\hat{y}_i$ to be encoded within the interval of the minimum and maximum values.

19. A method performed in an image processing system for optimizing its parameters, the method comprising:

generating compressed latent variables $y_i$ from an image X;

generating, by a Softmax function, normalized probabilities $P_y(P_{yi})$ indicating the probabilities of rounding the latent variables $y_i$ to each of a plurality of integer quantization levels, and generating final quantized latent variables $\hat{y}_i$ for the latent variables $y_i$ by:

summing up a multiplication of each of the plurality of integer quantization levels with each of the normalized probabilities $P_{yi}$ to generate a pre-quantized latent variable $y'_i$ for each latent variable $y_i$, and generating the final quantized latent variables $\hat{y}_i$ by rounding each of the pre-quantized latent variable $y'_i$ to its nearest integer level, $\hat{y}$=Round ($y'$);

reconstructing an image $\hat{X}$ from the final quantized latent variables $\hat{y}_i$;

generating latent variables $z_j$ further compressed from the latent variables $y_i$;

quantizing the further compressed latent variables $z_j$;

estimating the probability of the latent variables $z_j$ and generating a second bitrate R2;

reconstructing a discrete probability distribution $V(V_i)$ for each latent variable $y_i$ from the estimated probabilities of the latent variables $z_j$;

generating probabilities for the plurality of integer quantization levels for each latent variable $y_i$;

generating a normalized probability mass function $P_{r_i}$ by normalizing the reconstructed probability distribution $V(V_i)$ using a Softmax function for each latent variable $y_i$;

calculating a first bitrate R1 as a sum of the cross entropy of the normalized probability $P_{y_i}$ and the normalized probability mass function $P_{r_i}$ of all latent variables $y_i$;

calculating a distortion D from the original image X and the reconstructed image $\hat{X}$;

optimizing the parameters of the image processing system by a rate-distortion function.

20. The method according to claim 19, wherein the rate-distortion function is to minimize $\lambda D+R1+R2$, where $\lambda$ is a coefficient controlling the rate-distortion optimization.

* * * * *